US011442168B2

(12) United States Patent
Nicke et al.

(10) Patent No.: US 11,442,168 B2
(45) Date of Patent: *Sep. 13, 2022

(54) VEHICULAR DRIVING ASSIST SYSTEM WITH LIDAR SENSORS THAT EMIT DIFFERENT PATTERNS OF LIGHT

(71) Applicant: Magna Electronics Inc., Auburn Hills, MI (US)

(72) Inventors: Peter Nicke, Boeblingen (DE); Benjamin May, Lübs (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/949,313

(22) Filed: Oct. 26, 2020

(65) Prior Publication Data

US 2021/0041566 A1  Feb. 11, 2021

Related U.S. Application Data

(63) Continuation of application No. 16/197,484, filed on Nov. 21, 2018, now Pat. No. 10,816,666.

(60) Provisional application No. 62/589,122, filed on Nov. 21, 2017.

(51) Int. Cl.
*G01S 17/87* (2020.01)
*G01S 17/89* (2020.01)
*G01S 17/86* (2020.01)
*G01S 17/931* (2020.01)

(52) U.S. Cl.
CPC .............. *G01S 17/87* (2013.01); *G01S 17/86* (2020.01); *G01S 17/89* (2013.01); *G01S 17/931* (2020.01); *G06T 2207/10028* (2013.01)

(58) Field of Classification Search
CPC ...................... G06T 2207/10028; G01S 17/86
USPC .......................................... 701/300
See application file for complete search history.

(56) References Cited

U.S. PATENT DOCUMENTS

| 5,949,331 A | 9/1999 | Schofield et al. |
| 6,587,186 B2 | 7/2003 | Bamji et al. |
| 6,674,895 B2 | 1/2004 | Rafii et al. |
| 6,678,039 B2 | 1/2004 | Charbon |

(Continued)

FOREIGN PATENT DOCUMENTS

| CA | 2842814 A1 * | 8/2014 | ............ G01S 17/10 |
| DE | 202018100323 U1 * | 4/2018 | ............ G01S 7/4811 |

(Continued)

*Primary Examiner* — Atul Trivedi
(74) *Attorney, Agent, or Firm* — Honigman LLP

(57) ABSTRACT

A vehicular driving assist system includes a plurality of lidar sensors having respective fields of sensing exterior the vehicle, with the fields of sensing of first and second lidar sensors partially overlapping at an overlap region. The lidar sensors emit a respective pattern of light and provide a respective output to an ECU based on sensed light that is reflected by objects present in the field of sensing of the respective lidar sensor. The pattern of light emitted by the second lidar sensor differs from the pattern of light emitted by the first lidar sensor. The ECU determines misalignment of the second lidar sensor relative to the first lidar sensor based at least in part on the light sensed by each of the lidar sensors that is reflected by an object present in the overlap region when the respective pattern of light is emitted by the respective lidar sensor.

32 Claims, 2 Drawing Sheets

(56) References Cited

U.S. PATENT DOCUMENTS

| | | | |
|---|---|---|---|
| 6,690,354 B2 | 2/2004 | Sze | |
| 6,710,770 B2 | 3/2004 | Tomasi et al. | |
| 6,825,455 B1 | 11/2004 | Schwarte | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 7,053,357 B2 | 5/2006 | Schwarte | |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 8,013,780 B2 | 9/2011 | Lynam | |
| 8,027,029 B2 | 9/2011 | Lu et al. | |
| 9,036,026 B2 | 5/2015 | Dellantoni et al. | |
| 9,056,395 B1* | 6/2015 | Ferguson | B60W 30/09 |
| 9,063,549 B1* | 6/2015 | Pennecot | G01S 17/931 |
| 9,146,898 B2 | 9/2015 | Ihlenburg et al. | |
| 9,383,753 B1* | 7/2016 | Templeton | G01S 17/42 |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,753,121 B1 | 9/2017 | Davis et al. | |
| 10,061,019 B1* | 8/2018 | Campbell | G01S 7/4814 |
| 10,324,170 B1* | 6/2019 | Engberg, Jr. | G01S 17/89 |
| 10,551,501 B1* | 2/2020 | LaChapelle | G01S 7/4818 |
| 10,627,512 B1* | 4/2020 | Hicks | G06T 5/50 |
| 10,732,281 B2* | 8/2020 | LaChapelle | G01S 7/497 |
| 10,816,666 B2 | 10/2020 | Nicke et al. | |
| 2010/0245066 A1 | 9/2010 | Sarioglu et al. | |
| 2010/0289632 A1* | 11/2010 | Seder | G06V 10/95 382/104 |
| 2011/0164783 A1 | 7/2011 | Hays et al. | |
| 2013/0155723 A1 | 6/2013 | Coleman | |
| 2015/0131080 A1* | 5/2015 | Retterath | G01S 17/10 356/5.01 |
| 2015/0192677 A1* | 7/2015 | Yu | G01S 17/89 356/5.01 |
| 2016/0282468 A1* | 9/2016 | Gruver | G01S 7/4813 |
| 2016/0288699 A1* | 10/2016 | Solar | B60R 11/04 |
| 2016/0291134 A1* | 10/2016 | Droz | G01S 17/87 |
| 2016/0327636 A1* | 11/2016 | Gazit | G01S 7/4972 |
| 2017/0124781 A1* | 5/2017 | Douillard | G01S 17/931 |
| 2017/0153319 A1* | 6/2017 | Villeneuve | H01S 3/08086 |
| 2017/0155225 A1* | 6/2017 | Villeneuve | H01S 3/06758 |
| 2017/0168146 A1* | 6/2017 | Boehmke | G01S 17/89 |
| 2017/0176575 A1 | 6/2017 | Smits | |
| 2017/0222311 A1 | 8/2017 | Hess et al. | |
| 2017/0254873 A1 | 9/2017 | Koravadi | |
| 2017/0269197 A1* | 9/2017 | Hall | G01S 17/89 |
| 2017/0269198 A1* | 9/2017 | Hall | G01S 7/484 |
| 2017/0269209 A1* | 9/2017 | Hall | H04N 13/254 |
| 2017/0276788 A1 | 9/2017 | Wodrich | |
| 2017/0307736 A1* | 10/2017 | Donovan | G01S 7/499 |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0222450 A1 | 8/2018 | Kunze | |
| 2018/0231635 A1 | 8/2018 | Woehlte | |
| 2018/0284224 A1* | 10/2018 | Weed | G01S 7/484 |
| 2018/0284226 A1* | 10/2018 | LaChapelle | G01S 7/003 |
| 2018/0284234 A1* | 10/2018 | Curatu | G05D 1/024 |
| 2018/0284240 A1* | 10/2018 | LaChapelle | G01S 7/4861 |
| 2018/0284241 A1* | 10/2018 | Campbell | G01S 7/4861 |
| 2018/0284242 A1* | 10/2018 | Campbell | G01S 17/42 |
| 2018/0284245 A1* | 10/2018 | LaChapelle | G01S 7/4861 |
| 2018/0284247 A1* | 10/2018 | Campbell | G01S 17/10 |
| 2018/0284275 A1* | 10/2018 | LaChapelle | G01S 17/42 |
| 2018/0284278 A1* | 10/2018 | Russell | G01S 17/26 |
| 2018/0284279 A1* | 10/2018 | Campbell | G01S 7/4816 |
| 2018/0284286 A1* | 10/2018 | Eichenholz | G01S 17/89 |
| 2018/0299534 A1* | 10/2018 | LaChapelle | G01S 17/89 |
| 2019/0011541 A1 | 1/2019 | O'Keeffe | |
| 2019/0011567 A1* | 1/2019 | Pacala | G01S 7/497 |
| 2019/0052844 A1* | 2/2019 | Droz | G01S 17/86 |
| 2019/0072649 A1 | 3/2019 | Droz et al. | |
| 2019/0122386 A1* | 4/2019 | Wheeler | G01S 17/42 |
| 2019/0146066 A1 | 5/2019 | Kunze | |
| 2019/0154816 A1* | 5/2019 | Hughes | G01S 7/497 |
| 2019/0154833 A1* | 5/2019 | Nicke | G01S 17/87 |
| 2019/0227175 A1* | 7/2019 | Steinberg | G01S 17/93 |
| 2019/0271767 A1 | 9/2019 | Keilaf et al. | |
| 2019/0339382 A1 | 11/2019 | Hess et al. | |
| 2019/0353784 A1 | 11/2019 | Toledano et al. | |
| 2019/0361126 A1 | 11/2019 | Abari et al. | |
| 2019/0383911 A1* | 12/2019 | Zhang | G02B 26/0816 |
| 2020/0088859 A1* | 3/2020 | Shepard | G01S 7/4811 |
| 2020/0132850 A1* | 4/2020 | Crouch | G01S 17/89 |
| 2020/0142068 A1* | 5/2020 | Crouch | G01S 7/497 |
| 2020/0142073 A1 | 5/2020 | Gassend et al. | |
| 2020/0166617 A1* | 5/2020 | Crouch | G01S 17/931 |
| 2020/0166647 A1* | 5/2020 | Crouch | G01S 7/4816 |
| 2020/0174107 A1* | 6/2020 | Briggs | H04N 5/247 |
| 2020/0219264 A1* | 7/2020 | Brunner | G01S 7/4802 |
| 2020/0284913 A1* | 9/2020 | Amelot | G01S 17/894 |
| 2020/0309942 A1* | 10/2020 | Kunz | G01S 13/931 |
| 2021/0004610 A1* | 1/2021 | Huang | G01S 17/931 |
| 2021/0063578 A1* | 3/2021 | Wekel | G06K 9/6271 |
| 2021/0208263 A1* | 7/2021 | Sutavani | G01S 7/4972 |
| 2021/0221398 A1* | 7/2021 | Korobkin | G06K 9/6289 |
| 2021/0223373 A1* | 7/2021 | Korobkin | G01S 17/08 |
| 2021/0278851 A1* | 9/2021 | Van der Merwe | B62D 15/025 |
| 2021/0293931 A1* | 9/2021 | Nemet | G01S 7/4808 |
| 2021/0333371 A1* | 10/2021 | Pacala | G01S 7/4865 |
| 2022/0019640 A1* | 1/2022 | Hermann | G06F 16/972 |
| 2022/0075027 A1* | 3/2022 | Kahana | G01S 7/4817 |
| 2022/0091309 A1* | 3/2022 | Pomerantz | B29D 11/00596 |
| 2022/0126873 A1* | 4/2022 | Alghanem | B60W 30/095 |
| 2022/0128700 A1* | 4/2022 | Saranin | G06T 7/70 |
| 2022/0128701 A1* | 4/2022 | Alghanem | G01S 17/894 |
| 2022/0128702 A1* | 4/2022 | Ziglar | G06T 5/50 |
| 2022/0129684 A1* | 4/2022 | Saranin | G06K 9/6218 |

FOREIGN PATENT DOCUMENTS

| | | | | |
|---|---|---|---|---|
| DE | 202018100323 U1 * | 5/2018 | | G01S 17/931 |
| DE | 102017121112 B3 * | 12/2018 | | |
| DE | 102017220925 A1 * | 5/2019 | | B60Q 1/0023 |
| DE | 102018113711 A1 * | 12/2019 | | B60Q 1/0023 |
| DE | 102019115003 A1 * | 4/2020 | | B81B 1/006 |
| DE | 102019131098 A1 * | 10/2020 | | B60Q 1/0023 |
| DE | 102021122539 A1 * | 3/2022 | | B60R 11/04 |
| JP | 2019053034 A * | 4/2019 | | G01S 17/87 |
| KR | 20210089172 A * | 7/2021 | | G01S 7/497 |
| WO | WO-2009027221 A1 * | 3/2009 | | B60Q 1/085 |
| WO | 2011090484 A1 | 7/2011 | | |
| WO | WO-2017189185 A1 * | 11/2017 | | B60R 1/00 |
| WO | WO-2018127789 A1 * | 7/2018 | | A01C 5/04 |
| WO | WO-2019197894 A1 * | 10/2019 | | G01S 17/931 |
| WO | WO-2020243038 A1 * | 12/2020 | | G01S 17/86 |
| WO | WO-2021019308 A1 * | 2/2021 | | G01S 17/42 |
| WO | WO-2022016277 A1 * | 1/2022 | | G01B 11/22 |
| WO | WO-2022053874 A2 * | 3/2022 | | G01S 17/931 |

* cited by examiner

VEHICULAR DRIVING ASSIST SYSTEM WITH LIDAR SENSORS THAT EMIT DIFFERENT PATTERNS OF LIGHT

CROSS REFERENCE TO RELATED APPLICATIONS

The present application is a continuation of U.S. patent application Ser. No. 16/197,484, filed Nov. 21, 2018, now U.S. Pat. No. 10,816,666, which claims the filing benefits of U.S. provisional application Ser. No. 62/589,122, filed Nov. 21, 2017, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes a plurality of lidar sensor modules, each disposed at the vehicle to sense a respective region exterior of the vehicle. Each lidar sensor module includes a laser unit and a sensor unit. Each lidar sensor module has a field of sensing that is different than the other fields of sensing and partially overlaps at least one other field of sensing. The sensing system also includes a control that receives outputs from each lidar sensor module, and in response to these outputs, determines a combined field of sensing.

Each laser unit may transmit a pattern in overlap areas that is different from patterns transmitted in a non-overlap area. The patterns may be different by altering a laser energy output transmitted by the laser units. Each lidar sensor may be operable to detect pattern differences between the overlap areas and the non-overlap areas and the control may be operable to spatially synchronize the outputs of the lidar sensor modules based at least in part on the overlap and non-overlap patterns.

These and other objects, advantages, purposes and features of the present invention will become apparent upon review of the following specification in conjunction with the drawings.

DESCRIPTION OF THE PREFERRED EMBODIMENTS

A vehicle sensing system, such as a driver assist system, object detection system, parking assist system and/or alert system, operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space (or to assist an autonomous vehicle control in controlling the vehicle autonomously or semi-autonomously). The system includes a control that is operable to receive sensing data from multiple sensors and, responsive to the sensing data, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle), or controls one or more vehicle systems.

Figure 1:
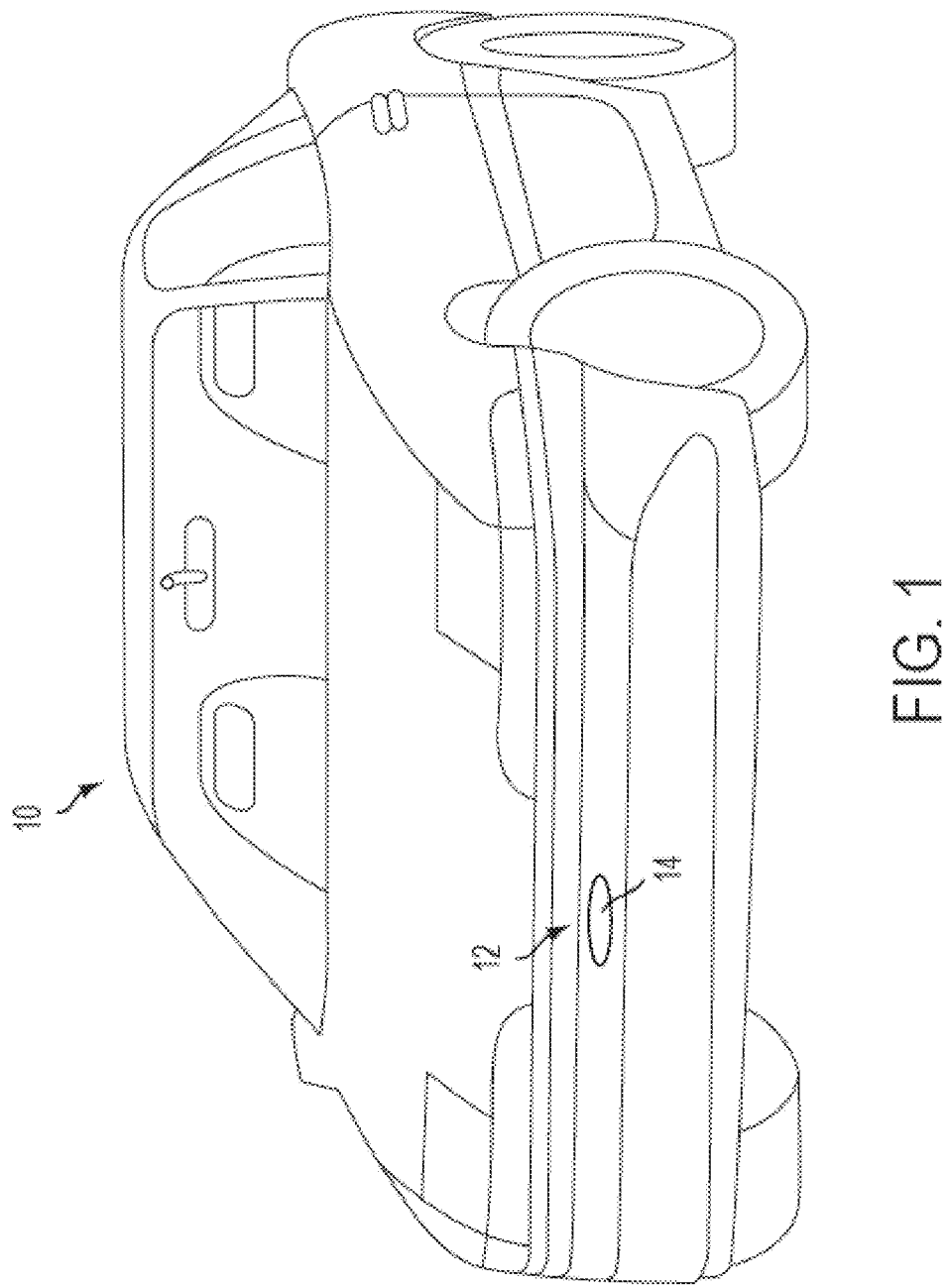
FIG. 1 is a perspective view of a vehicle with a sensing system that incorporates a lidar sensor module in accordance with the present invention.

Referring now to the drawings and the illustrative embodiments depicted therein, a vehicle 10 includes a lidar sensing system 12 (also known as LIDAR, LiDAR, and Lidar) that includes a plurality of lidar sensor modules or units such as a forward facing lidar sensor module or unit 14 (and other optional placement, such as a rearward facing sensor at the rear of the vehicle, and a sideward/rearward facing sensor at respective sides of the vehicle), which sense regions exterior of the vehicle (FIG. 1). The sensing system 12 includes a control or electronic control unit (ECU) or processor that is operable to process data captured by the sensors and may detect objects or the like. The data transfer or signal communication from the sensor to the ECU may comprise any suitable data or communication link, such as a vehicle network bus or the like of the equipped vehicle. The lidar sensor module 14 and system 12 may utilize aspects of the sensing modules and systems described in U.S. Publication No. US-2018-0222450, which is hereby incorporated herein by reference in its entirety.

The automotive lidar sensor modules 14 of the present invention are configured to be mounted outside of the vehicle for detecting the environmental scene. A preferred location for these lidar sensor modules 14 to mount is within the bumpers and viewing or sensing outwardly. Generally, every design element at or in which a lidar sensor can be hidden and has an effectual view opening is optionally a place for mounting a lidar sensor, such as at the front grill, the head lights, the daytime running lights, a blinker, the license plate illumination, the tire housings, the vehicle emblem, the trunk lid opener handle, the door handles, the rearview mirrors or wing elements with rear view cameras at the place where usually the rearview mirrors were, the rooftop bars, the roof top antenna fins or the spoiler or the like.

Figure 2A:
FIGS. 2A-2D are a graphical representation of a combined field of sensing generated by the lidar sensing system shown in FIG. 1.
Figure 2B:
Figure 2C:
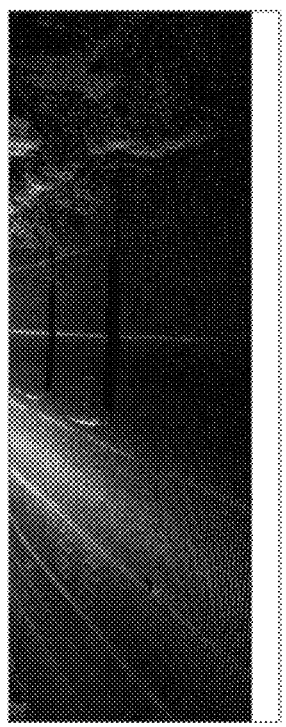
Figure 2D:
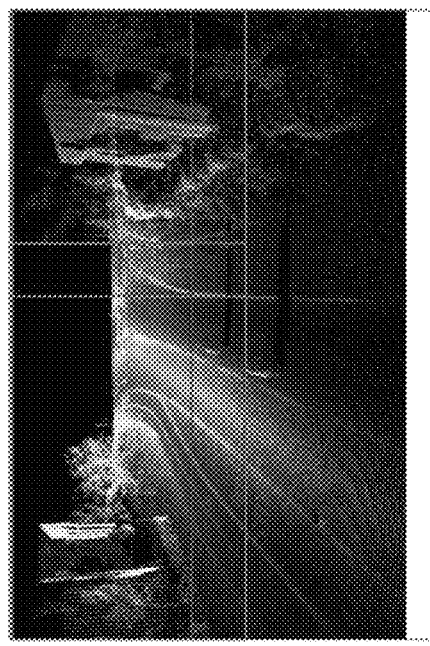

It is often advantageous to have a field of sensing that is wider than an individual sensor module 14 can provide. For example, a 360 degree field of sensing may be desired. To achieve a 360 field of sensing, three sensor modules with a field of sensing of 120 degrees may be used. However, for reasons such as mounting tolerances, this may lead to gaps or mismatches in the combined field of sensing. Therefore, sensor modules 14 with a wider field of sensing can be used, causing an overlap in the fields of sensing. It is then necessary to accurately "stitch" the overlapping fields of sensing together to determine a combined field of sensing. This allows the field of sensing of multiple sensor modules 14 (FIGS. 2A-2C) to be combined both spatially and temporally into a single field of sensing (FIG. 2D).

In accordance with the present invention, each lidar sensor module 14 comprises a laser unit or laser generator or laser light source and a sensor unit or sensor and each module 14 is disposed at a vehicle 10 in such a way to give each module 14 a respective field of sensing exterior of the vehicle 10. Each field of sensing is different from one another and partially overlaps at least one other field of sensing. The overlap may be any amount, but a minimal overlap is optimal. For example, the overlap may be just enough to overcome mounting tolerances. Each laser unit outputs a pulsed laser light that is reflected by a target. As the target reflects the laser light back toward system 12, each respective sensor unit measures the reflected pulse from its associated laser unit.

Sensing system 12 also includes a control. The control communicates with each lidar sensor module 14 and receives data output from the modules. The data output includes the measured reflected pulses. Differences in return times and wavelengths can be used to generate a three dimensional (3D) point cloud of the target. Responsive to these outputs, the control determines a combined field of sensing. Point clouds generated by separate sensor modules may be fused together by different region-of-interests (ROIs) or subareas. These subareas are stitched together to cover the entire field of sensing. Each subarea is typically generated by an independent sensor module 14. When being stitched, it is desirous that the subareas be stitched accurately temporally and spatially.

To this end, each laser unit that transmits in an overlap area may transmit a pattern of pulsed laser light that is different than each other pattern transmitted in the overlap area by other laser units. That is, for example, if two fields of sensing generated by two laser units has one overlap area between them, each laser may transmit a unique pattern in the overlap area. A laser unit may transmit the same pattern in overlap areas and non-overlap areas or transmit different patterns in overlap areas versus non-overlap areas. The laser units may alter the pattern in any number of ways. For example, the laser units may alter a laser energy level of the transmitted laser light. Each sensor unit may be operable to detect pattern differences between the overlap areas and the non-overlap areas. Alternatively, the control may be operable to determine differences in the patterns. The control may determine a degree of misalignment of a lidar sensor module relative to another lidar sensor module based on the detected pattern differences. That is, the control may determine an amount of actual overlap between the fields of sensing of the lidar sensor modules.

The control may be operable to determine, based at least on the detected patterns, an alignment marker (e.g., at the border between the overlap and non-overlap area). With such an alignment marker, in conjunction with computer vision analysis of subpictures and reordering of the subareas and other intelligent algorithms, the lidar data representative of the field of sensing of each sensor module 14 may be spatially synchronized and combined. In some examples, a laser unit detects the alignment marker of another laser unit and adjusts its field of sensing accordingly by mapping its overlap area with the other laser unit's overlap area. The control may determine a failure when the stitching fails, and report a failed framed to the system 12. In this way, the overlap area can be minimized, as the control can accurately stitch the fields of sensing without requiring a large overlap area.

For example, a first laser unit may transmit a pattern "A" and a second laser unit may transmit a pattern "B", with the patterns being different from one another and overlapping at an overlap area or region. The second laser unit detects the pattern A and can align its position via detection and processing of the received pattern A reflections. Optionally, the system or second laser unit can map the pattern "A" with its pattern "B" to determine alignment of the second laser unit relative to the first laser unit. The system thus is operable to determine the alignment of one laser unit relative to another via processing of a pattern transmitted by the other laser unit at an area where the first laser unit senses.

The system thus calibrates and combines the sensor information in a way that the Lidar sensors fit together at the borders of the fields of sensing. With a minimum overlap area of the different sensors, a special pattern can be projected by the Lidar (e.g., by adapting the laser energy pixel wise), and the special pattern can be recognized by both sensors. The system or processor processes data captured by the sensors and spatially synchronizes the data.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, and/or U.S. patent application Ser. No. 16/190,201, filed Nov. 14, 2018, and published as US-2019-0146066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assist system, the vehicular driving assist system comprising:

a plurality of lidar sensors disposed at a vehicle equipped with the vehicular driving assist system, wherein the plurality of lidar sensors comprises at least (i) a first lidar sensor having a first field of sensing exterior the equipped vehicle and (ii) a second lidar sensor having a second field of sensing exterior the equipped vehicle;

an electronic control unit (ECU) including a data processor;

wherein the first field of sensing of the first lidar sensor partially overlaps the second field of sensing of the second lidar sensor at an overlap region;

wherein the first lidar sensor emits a first pattern of light and provides a first output to the ECU based on sensed light that is reflected by objects present in the first field of sensing of the first lidar sensor;

wherein the second lidar sensor emits a second pattern of light and provides a second output to the ECU based on sensed light that is reflected by objects present in the second field of sensing of the second lidar sensor;

wherein the second pattern of light emitted by the second lidar sensor differs from the first pattern of light emitted by the first lidar sensor; and wherein the ECU, responsive to processing at the ECU of the first output and the second output, determines misalignment of the second lidar sensor relative to the first lidar sensor based at least in part on (i) light sensed by the first lidar sensor that is reflected by an object present in the overlap region when the first pattern of light is emitted by the first lidar sensor and (ii) light sensed by the second lidar sensor that is reflected by the object present in the overlap region when the second pattern of light is emitted by the second lidar sensor.

2. The vehicular driving assist system of claim 1, wherein the first pattern of light comprises light pulsed by the first lidar sensor at a first pulse rate, and wherein the second pattern of light comprises light pulsed by the second lidar sensor at a second pulse rate that is different than the first pulse rate.

3. The vehicular driving assist system of claim 1, wherein the first pattern of light comprises emitted light emitted by the first lidar sensor having a first wavelength, and wherein the second pattern of light comprises emitted light by the second lidar sensor having a second wavelength that is different than the first wavelength.

4. The vehicular driving assist system of claim 1, wherein the first lidar sensor is disposed at a front grille of the equipped vehicle.

5. The vehicular driving assist system of claim 1, wherein the first lidar sensor is disposed at a headlight of the equipped vehicle.

6. The vehicular driving assist system of claim 1, wherein the first lidar sensor is disposed at an exterior rearview mirror assembly of the equipped vehicle.

7. The vehicular driving assist system of claim 1, wherein the object comprises a target disposed in the overlap region.

8. The vehicular driving assist system of claim 1, wherein the ECU, via processing at the ECU of the first output from the first lidar sensor and the second output from the second lidar sensor, generates a three dimensional (3D) point cloud.

9. The vehicular driving assist system of claim 1, wherein (a) the first lidar sensor comprises (i) a first light emitting unit that emits the first pattern of light and (ii) a first sensor unit that senses light reflected by objects present in the first field of sensing, and (b) the second lidar sensor comprises (i) a second light emitting unit that emits the second pattern of light and (ii) a second sensor unit that senses light reflected by objects present in the second field of sensing.

10. The vehicular driving assist system of claim 1, wherein the ECU, via processing at the ECU of the first output of the first lidar sensor and the second output from the second lidar sensor, determines a pattern difference between the first pattern of light emitted by the first lidar sensor at the overlap region and the second pattern of light emitted by the second lidar sensor at the overlap region.

11. The vehicular driving assist system of claim 10, wherein the ECU, via processing at the ECU of the first output of the first lidar sensor and the second output from the second lidar sensor, spatially synchronizes the first output and the second output based at least in part on the determined pattern difference at the overlap region.

12. The vehicular driving assist system of claim 10, wherein the ECU, based at least in part on the determined pattern difference, determines a first alignment marker between a non-overlap region of the first field of sensing and the overlap region and determines a second alignment marker between a non-overlap region of the second field of sensing and the overlap region.

13. The vehicular driving assist system of claim 12, wherein the ECU determines a combined field of sensing via processing at the ECU of the first and second outputs and the first and second alignment markers.

14. The vehicular driving assist system of claim 1, comprising a third lidar sensor that has a field of sensing that overlaps the field of sensing of the second lidar sensor, wherein each of the first, second and third lidar sensors has a field of sensing greater than 120 degrees.

15. The vehicular driving assist system of claim 1, wherein the first field of sensing of the first lidar sensor partially overlaps the second field of sensing of the second lidar sensor by an amount that is equivalent to mounting tolerances of the first lidar sensor and the second lidar sensor.

16. A vehicular driving assist system, the vehicular driving assist system comprising:

a plurality of lidar sensors disposed at a vehicle equipped with the vehicular driving assist system, wherein the plurality of lidar sensors comprises at least (i) a first lidar sensor having a first field of sensing exterior the equipped vehicle and (ii) a second lidar sensor having a second field of sensing exterior the equipped vehicle;

an electronic control unit (ECU) including a data processor;

wherein the first field of sensing of the first lidar sensor partially overlaps the second field of sensing of the second lidar sensor at an overlap region;

wherein the first lidar sensor comprises (i) a first light emitting unit that emits a first pattern of light and (ii) a first sensor unit that senses light reflected by objects present in the first field of sensing;

wherein the second lidar sensor comprises (i) a second light emitting unit that emits a second pattern of light and (ii) a second sensor unit that senses light reflected by objects present in the second field of sensing;

wherein the second pattern of light emitted by the second light emitting unit of the second lidar sensor differs from the first pattern of light emitted by the first light emitting unit of the first lidar sensor;

wherein the first lidar sensor provides a first output to the ECU based on sensed light that is reflected by objects present in the first field of sensing of the first lidar sensor;

wherein the second lidar sensor provides a second output to the ECU based on sensed light that is reflected by objects present in the second field of sensing of the second lidar sensor;

wherein the ECU, responsive to processing at the ECU of the first output and the second output, determines misalignment of the second lidar sensor relative to the first lidar sensor based at least in part on (i) light sensed by the first sensor unit of the first lidar sensor that is reflected by an object present in the overlap region when the first pattern of light is emitted by the first light emitting unit of the first lidar sensor and (ii) light sensed by the second sensor unit of the second lidar sensor that is reflected by the object present in the overlap region when the second pattern of light is emitted by the second light emitting unit of the second lidar sensor; and wherein the ECU, via processing at the ECU of the first output from the first lidar sensor and the second output from the second lidar sensor, generates a three dimensional (3D) point cloud.

17. The vehicular driving assist system of claim 16, wherein the first pattern of light comprises light pulsed by the first light emitting unit of the first lidar sensor at a first pulse rate, and wherein the second pattern of light comprises light pulsed by the second light emitting unit of the second lidar sensor at a second pulse rate that is different than the first pulse rate.

18. The vehicular driving assist system of claim 16, wherein the first pattern of light comprises emitted light emitted by the first light emitting unit of the first lidar sensor having a first wavelength, and wherein the second pattern of light comprises emitted light by the second light emitting unit of the second lidar sensor having a second wavelength that is different than the first wavelength.

19. The vehicular driving assist system of claim 16, wherein the first lidar sensor is disposed at a front grille of the equipped vehicle.

20. The vehicular driving assist system of claim 16, wherein the first lidar sensor is disposed at a headlight of the equipped vehicle.

21. The vehicular driving assist system of claim 16, wherein the first lidar sensor is disposed at an exterior rearview mirror assembly of the equipped vehicle.

22. The vehicular driving assist system of claim 16, wherein the object comprises a target disposed in the overlap region.

23. The vehicular driving assist system of claim 16, comprising a third lidar sensor that has a field of sensing that overlaps the field of sensing of the second lidar sensor, wherein each of the first, second and third lidar sensors has a field of sensing greater than 120 degrees.

24. The vehicular driving assist system of claim 16, wherein the first field of sensing of the first lidar sensor partially overlaps the second field of sensing of the second lidar sensor by an amount that is equivalent to mounting tolerances of the first lidar sensor and the second lidar sensor.

25. A vehicular driving assist system, the vehicular driving assist system comprising:

a plurality of lidar sensors disposed at a vehicle equipped with the vehicular driving assist system, wherein the plurality of lidar sensors comprises at least (i) a first lidar sensor having a first field of sensing exterior the equipped vehicle and (ii) a second lidar sensor having a second field of sensing exterior the equipped vehicle;

an electronic control unit (ECU) including a data processor;

wherein the first field of sensing of the first lidar sensor partially overlaps the second field of sensing of the second lidar sensor at an overlap region;

wherein the first lidar sensor comprises (i) a first light emitting unit that emits a first pattern of light and (ii) a first sensor unit that senses light reflected by objects present in the first field of sensing;

wherein the second lidar sensor comprises (i) a second light emitting unit that emits a second pattern of light and (ii) a second sensor unit that senses light reflected by objects present in the second field of sensing;

wherein the first pattern of light comprises light pulsed by the first light emitting unit of the first lidar sensor at a first pulse rate, and wherein the second pattern of light comprises light pulsed by the second light emitting unit of the second lidar sensor at a second pulse rate that is different than the first pulse rate;

wherein the first lidar sensor provides a first output to the ECU based on sensed light that is reflected by objects present in the first field of sensing of the first lidar sensor;

wherein the second lidar sensor provides a second output to the ECU based on sensed light that is reflected by objects present in the second field of sensing of the second lidar sensor; and wherein the ECU, responsive to processing at the ECU of the first output and the second output, determines misalignment of the second lidar sensor relative to the first lidar sensor based at least in part on (i) light sensed by the first sensor unit of the first lidar sensor that is reflected by an object present in the overlap region when the first pattern of light is emitted by the first light emitting unit of the first lidar sensor and (ii) light sensed by the second sensor unit of the second lidar sensor that is reflected by the object present in the overlap region when the second pattern of light is emitted by the second light emitting unit of the second lidar sensor.

26. The vehicular driving assist system of claim 25, wherein the first lidar sensor is disposed at a front grille of the equipped vehicle.

27. The vehicular driving assist system of claim 25, wherein the first lidar sensor is disposed at a headlight of the equipped vehicle.

28. The vehicular driving assist system of claim 25, wherein the first lidar sensor is disposed at an exterior rearview mirror assembly of the equipped vehicle.

29. The vehicular driving assist system of claim 25, wherein the object comprises a target disposed in the overlap region.

30. The vehicular driving assist system of claim 25, wherein the ECU, via processing at the ECU of the first output from the first lidar sensor and the second output from the second lidar sensor, generates a three dimensional (3D) point cloud.

31. The vehicular driving assist system of claim 25, comprising a third lidar sensor that has a field of sensing that overlaps the field of sensing of the second lidar sensor, wherein each of the first, second and third lidar sensors has a field of sensing greater than 120 degrees.

32. The vehicular driving assist system of claim 25, wherein the first field of sensing of the first lidar sensor partially overlaps the second field of sensing of the second lidar sensor by an amount that is equivalent to mounting tolerances of the first lidar sensor and the second lidar sensor.

* * * * *